United States Patent [19]

Hirsenkorn

[11] Patent Number: 5,536,826

[45] Date of Patent: Jul. 16, 1996

[54] PROCESS FOR PREPARING AMINO-FUNCTIONAL CYCLODEXTRIN DERIVATIVE

[75] Inventor: Rolf Hirsenkorn, München, Germany

[73] Assignee: Consortium für elektrochemische Industrie GmbH, München, Germany

[21] Appl. No.: 354,637

[22] Filed: Dec. 13, 1994

[30] Foreign Application Priority Data

Jan. 20, 1994 [DE] Germany .............. 44 01 618.2

[51] Int. Cl.$^6$ .............. C08B 37/16; C07D 263/24; C07D 263/52; C07D 265/10
[52] U.S. Cl. .............. 536/103; 536/107; 536/115; 536/124
[58] Field of Search .............. 536/103, 107, 536/115, 124

[56] References Cited

U.S. PATENT DOCUMENTS

| | | | |
|---|---|---|---|
| 3,553,191 | 1/1971 | Parmerter | 536/103 |
| 4,920,214 | 4/1990 | Freidman | 536/103 |
| 5,354,852 | 10/1994 | Ikeda | 536/56 |

FOREIGN PATENT DOCUMENTS

| | | |
|---|---|---|
| 3712246 | 10/1987 | Germany . |
| 4136325 | 5/1991 | Germany . |
| 9012035 | 10/1990 | WIPO . |

OTHER PUBLICATIONS

CA 117:92570 "Lower—aminoalkylated cyclodextrin derivatives as color developers for nitrophenols" Yagi, Tatsuhiko: et. al., Jpn Kokai Tokyo Koho, 1992.

B. L. Philips, P.A. Argabright, J. Heterocycl. Chem. 3, 84 (1966). "Reaction of Inorganic Cyanates with Halides. II. Reactions of Chlorohydrins".

K. Laumen, E. H. Reimerdes, M. Schneider, Tetrahedron Letters 26 (4), 407–410 (1985). "Immobilized Porcine Liver Esterase: A convenient reagent for the preparation of chiral building blocks".

Primary Examiner—Nathan M. Nutter
Attorney, Agent, or Firm—Collard & Roe

[57] ABSTRACT

A process for preparing amino-functional cyclodextrin derivatives has an amino function which is linked to the cyclodextrin (CD) via a spacer. Compositions containing CD derivatives are prepared by this process. In this process, α-cyclodextrin, β-cyclodextrin or γ-cyclodextrin, or their partially substituted derivatives, is reacted individually or in arbitrary mixture with at least one cyclic carbamic ester. The CD derivatives, as regards the listed amino substituents, have an average degree of molar substitution per anhydroglucose unit (MS) of 0.01–0.2 and a proportion of monoamino-substituted CD derivatives which is greater than 70%.

10 Claims, No Drawings

PROCESS FOR PREPARING AMINO-FUNCTIONAL CYCLODEXTRIN DERIVATIVE

BACKGROUND OF THE INVENTION

1. Field of the Invention

The invention relates to a process for preparing amino-functional cyclodextrin derivatives having an amino function which is linked to the cyclodextrin (CD) via a spacer.

2. The Prior Art

The following processes for preparing cyclodextrin derivatives in which the amino function is linked to the cyclodextrin via a spacer are known from the literature:

CA 117:92570 (corresponds to JP 04100801) discloses the preparation of 2-dialkylaminoethyl-substituted CD's by alkylating CD using dialkylaminoethyl chloride. Only tertiary amines can be produced by this process since, otherwise, the problem arises of the formation of polyethyleneimine chains. Furthermore, in this process, the corresponding salt is formed in stoichiometric quantities as a waste product, in turn necessitating an elaborate separation of the substituted CD's.

U.S. Pat. No. 3,553,191 discloses the reaction of CD with ethyleneimine in the presence of acetic acid to form 2-aminoethyl-substituted CD's. The problem of the formation of polyethyleneimine chains also arises in this process. A further disadvantage of this process lies in the use of ethyleneimine, which is known to be very toxic and carcinogenic.

DE-A-41 36 325 discloses a number of amino-functional CD derivatives. As regards their preparation, reference is made to a number of publications in the literature.

SUMMARY OF THE INVENTION

It is an object of the present invention to provide an economical process which makes it possible to prepare cyclodextrin derivatives having at least one amino function linked to the CD via a spacer.

An additional object of the present invention is to make available amino-functional CD's which can be prepared by this process, in which the CD's possess advantageous properties, especially also as regards attaching to a polymeric support.

The above objects are achieved by a process in which α-cyclodextrin, β-cyclodextrin or γ-cyclodextrin, or their partially substituted derivatives, are reacted individually, or in arbitrary mixture, with at least one cyclic carbamic ester.

The reaction is preferably effected in the presence of a catalyst.

The process according to the invention is preferably carried out under a pressure extending from a slight vacuum, which is understood to mean a pressure of about 100 mm Hg, to inherent pressure, as arises when using a closed apparatus. The process according to the invention is particularly preferably carried out under a slight vacuum. This facilitates removal of the carbon dioxide arising during the reaction, and removes any water which may be present from industrial CD.

The process according to the invention can be carried out using a multiplicity of cyclodextrins, cyclodextrin derivatives and cyclic carbamic esters, and is thus very flexible.

Commercially available α-cyclodextrin, β-cyclodextrin and/or γ-cyclodextrin may be employed in the process according to the invention. However, the cyclodextrins can also be prepared in a manner known per se, for example by the enzymic reaction of starch with cyclodextrin glycosyl transferase (CGTase, E.C.2.4.1.19). Partially substituted cyclodextrin derivatives, such as, for example, CD ethers and CD esters, having at least one free hydroxyl group can also be employed. Examples of such derivatives are partially substituted hydroxyalkylcyclodextrins, partially substituted alkylcyclodextrins, partially substituted alkenylcyclodextrins, partially glycosylated cyclodextrins, partially substituted acylcyclodextrins or partially substituted acetylcyclodextrins.

α-Cyclodextrin, β-cyclodextrin and/or γ-cyclodextrin, partially substituted hydroxyalkyl cyclodextrins, such as, for example, hYdroxypropylcyclodextrins, partially substituted alkylcyclodextrins, such as, for example, methylcyclodextrins, and/or partially substituted alkenylcyclodextrins are preferably employed in the process according to the invention.

The cyclodextrins may be employed at commercially available quality and with a water content which is preferably between 0 and 15% by weight. They do not have to satisfy any particular requirements as regards purity. For reasons of cost, cyclodextrins or cyclodextrin derivatives having a water content which, as a rule, is of from 10 to 15% by weight, as are obtainable commercially, are particularly preferably employed.

2-Oxazolidinone, 3-methyl-2-oxazolidinone, 3-ethyl-2-oxazolidinone, 3-propyl-2-oxazolidinone, 3-butyl-2-oxazolidinone, 3-(2-hydroxyethyl)-2-oxazolidinone, 3-(2-hydroxypropyl)-2-oxazolidinone, 3-phenyl-2-oxazolidinone, 3-acetyl-2-oxazolidinone, 3-propionyl-2-oxazolidinone, 4-ethyl-2-oxazolidinone, 4-isopropyl-2-oxazolidinone, 4-tert-butyl- 2-oxazolidinone, 4-benzyl-2-oxazolidinone, 4-phenyl-2-oxazolidinone, 5-methyl-2-oxazolidinone, 3-(2-hydroxypropyl)- 5-methyl-2-oxazolidinone, 3 - ( 2 -hydroxypropyl ) -5-methyl-2-oxazolidinone, 4-methyl-5-propyl-2-oxazolidinone, 4-methyl-5-phenyl- 2-oxazolidinone, 1-oxa-2-azaspiro[4.5]decan-2-one, 2-oxazinone or 2-oxazepinone, or mixtures of the said substances, are preferably employed as cyclic carbamic esters. 2-Oxazinone can be prepared as described in B. L. Philips, P. A. Argabright, J. Heterocycl. Chem. 3, 84 (1968), while the remaining substances are obtainable commercially.

2-Oxazolidinone, 3-methyl-2-oxazolidinone, 2-oxazinone or 2-oxazepinone are particularly preferably employed.

The cyclic carbamic esters are employed at commercially available purity and freedom from water.

The reaction proceeds in solution or in suspension, preferably in solution. The reaction mixture is preferably free from water apart from the water content which is present in the starting substances of commercially available purity. The reaction is preferably carried out without using solvent. The carbamic ester is preferably employed in excess. If volatile carbamic esters, which are understood to mean, in particular, carbamic esters having a boiling point (0.01 mm Hg) which is less than 180° C. are used more than 90% of any excess of these esters can be recovered by separation by means of distillation once the reaction is complete.

It is possible to dilute the reaction mixture with inert solvents. Examples of inert solvents which can be employed are dimethylformamide, N-methylpyrrolidone, dimethyl sulfoxide, dimethylacetamide, methylformamide, formamide, tetrahydrofuran, dioxane, acetone, ethyl acetate, pyridine or dichloromethane, or their mixtures. Dimethylformamide is preferably used. The solvents should preferably be employed in anhydrous form.

The reaction is preferably carried out in the presence of a catalyst. A base and/or at least one basic ion exchanger is/are preferably employed as a catalyst. The catalyst is preferably employed in a form which is largely anhydrous.

Sodium hydroxide, potassium hydroxide, calcium hydroxide, calcium oxide, sodium carbonate or potassium carbonate, or their mixtures, are preferably employed as bases. Sodium hydroxide, potassium hydroxide, sodium carbonate and/or potassium carbonate are particularly preferably employed.

Macroreticular ion exchangers which are strongly basic are preferably employed as basic ion exchangers. Examples of those which are suitable are macroreticular, strongly basic ion exchangers constructed from a styrene/divinylbenzene copolymer having $NR_3^+Cl^-$ groups, such as, for example, those sold under the trademark Amberlite® IRA-910 (from Rohm & Haas) or macroreticular, strongly basic ion exchangers having $NMe_3^+Cl^-$ groups, such as, for example, those sold under the trademark Amberlyst® A26 (from Rohm & Haas).

In the process according to the invention, at least one cyclodextrin or cyclodextrin derivative, at least one carbamic ester and at least one catalyst are mixed together in arbitrary sequence. Cyclodextrin and carbamic ester are employed in a molar ratio of from 1:0.2 to 1:20, preferably of from 1:5 to 1:10, while cyclodextrin and anhydrous catalyst are employed in a molar ratio of from 1:0.01 to 1:10, preferably of from 1:0.1 to 1:1.

It is favorable to have an excess of carbamic ester in the reaction mixture of the process according to the invention. When easily recoverable carbamic esters, which are understood to mean, in particular, carbamic esters having a boiling point which is below 150° C. at 0.01 mm Hg, are used, these esters are also preferably employed as the reaction medium.

Relatively large quantities of catalyst, of preferably from 0.5 to 8 mol of catalyst per mol of CD, promote the speed of conversion of the reaction. It is also favorable, but not absolutely necessary, for increasing the conversion to add the catalyst in portions, i.e. in at least two portions, preferably in from 4 to 8 portions.

The reaction proceeds at temperatures of from 60° C. to 170° C. preferably at from 100° to 150° C., over a period of time from 2 to 10 hours. The reaction time is customarily from about 6 to 8 hours.

If the carbamic ester employed is volatile under high vacuum (0.01 mm Hg) at temperatures of up to about 180° C., it is distilled off under a suitable vacuum once the reaction has been completed.

The reaction mixture is taken up in a solvent, preferably water. The mixture is adjusted to the desired pH (from pH 7 to 10) using a mild acid. Acetic acid, phosphoric acid, hydrochloric acid or an acidic ion exchanger, preferably a strongly acidic, macroreticular cation exchanger in the $Na^+$ form, such as, for example, the styrene/divinylbenzene copolymer sold under the trademark Amberlite® 200 or a weakly acidic, macroreticular cation exchanger in the $H^+$ form, such as, for example, sold under the trademark Amberlite® IRC-50 (both from Rohm and Haas) is preferably employed as the mild acid.

The cyclodextrin derivatives according to the invention may be purified by methods known from the state of the art. As an example, the concentrated aqueous solution is added dropwise to about tenfold the quantity, based on the volume of the water phase, of an organic solvent. The product, which has precipitated out, is filtered off or centrifuged (for example at 10 g for 10 min) and then dried. The dried precipitate is dissolved. Water, for example, can be used as the solvent.

The products can also be purified by other methods which are known for purifying cyclodextrin or cyclodextrin derivatives. Examples of such methods are direct crystallization, active charcoal adsorption, ion exchange chromatography, gel permeation chromatography, dialysis methods or enzymic degradation methods.

Further purification of the cyclodextrin derivatives obtained in accordance with the invention can, for example, be effected, as is also known from the state of the art, by column chromatography or preparative HPLC or dialysis (e.g. dialysis tubing made from benzoylated cellulose, from Sigma, D-8024, Deisenhofen).

Cyclodextrin derivatives without an amino function linked via a spacer, as can still be present in the reaction mixture when the degree of substitution is very low, can be separated off, for example, by ion exchange chromatography on acidic ion exchangers, such as, for example, a strongly acidic, gelatinous cation exchanger having a crosslinked polystyrene matrix and sulfonic acid groups, as can be obtained from Bayer AG, Leverkusen, and sold under the trademark Levatit® S 100.

To do this, the CD's which are not amino-substituted are first eluted using a suitable eluent (e.g. water) from the column which is loaded with the reaction products, and the amino-substituted CD derivatives are then eluted using a suitable eluent, such as, for example, a salt solution (e.g. 1 M NaCl) or an acid (e.g. 1M HCl). Amino-substituted CD's may be purified very simply using this method.

In one possible embodiment of the process according to the invention, hydroxyalkylation and amino-functionalization are effected in one mixture, proceeding from native CD's.

For this, CD is reacted, as is known from the state of the art, which alkylene oxide and potassium carbonate (see, for example, DE 3,712,246 or alkylene oxide and aqueous NaOH (see, for example, WO 90/12035). The quantity ratios are selected in accordance with the sought-after degree of substitution, as described in the literature references mentioned. Once the hydroxyalkylation has been completed, carbamic ester is then added. The excess alkylene oxide, and also any water which may be present, are distilled off while heating slowly. The distillation is preferably carried out at from about 80° to 100° C., where appropriate under a partial vacuum. The reaction with the carbamic ester is then carried out at a temperature of from 100° to 150° C. under partial vacuum (about 200 mm Hg), with potassium carbonate or NaOH, respectively, which are still present functioning as the catalyst.

The process according to the invention thus offers a number of advantages over the processes which are known from the state of the art. In addition to this, the process according to the invention is environmentally friendly, since starting substances which have not reacted can be recovered and reintroduced into the process. Furthermore, the process according to the invention only involves the use of a minimal quantity of salt and avoids having to deal with carcinogenic substances.

The process according to the invention results in cyclodextrin derivatives of the following formula I:

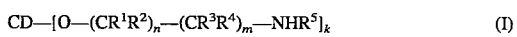

$$CD\text{—}[O\text{—}(CR^1R^2)_n\text{—}(CR^3R^4)_m\text{—}NHR^5]_k \qquad (I)$$

where CD denotes alpha-cyclodextrin, beta-cyclodextrin or gamma-cyclodextrin, or derivatives of alpha-cyclodextrin, beta-cyclodextrin or gamma-cyclodextrin, having at least one free OH group;

$R^1$, $R^2$, $R^3$ and $R^4$ are either identical or different and denote hydrogen or $C_1$ to $C_4$ alkyl-, or aryl-, or aryl- which is substituted by hydroxyl, alkoxy, halogen and/or alkylamine, or, when two of the radicals $R^1$ to $R^4$, are linked, cycloalkyl-, or cycloalkyl-, which is substituted by hydroxyl, alkoxy, halogen and/or alkylamine, $R_5$ has the same meaning as mentioned for $R^1$ to $R^4$, or denotes carboxyl-, n and m are either identical or different and denote 1, 2 or 3.

and, if CD is an α-cyclodextrin, k denotes an integer from 1 to 18, or, if CD is a β-cyclodextrin, k denotes an integer from 1 to 21, or, if CD is a γ-cyclodextrin, k denotes an integer from 1 to 24, or, if CD is one of the said CD derivatives, k denotes an integer from 1 up to the number of free OH groups on the CD derivative.

The alkyl, the alkoxy, the alkylamine, and the cycloalkyl can have a $C_1$ to $C_4$ carbon chain range.

In the products which are obtained by the process according to the invention, the amino function is always linked to the CD via a spacer. Within the meaning of the invention, a spacer is understood to mean an optionally substituted hydrocarbon radical having from 2 to 6 carbon atoms, such as binds the CD and the amino function in formula I.

The product distribution of the CD derivatives obtained by the process in accordance with the invention differs from the statistical product distribution such as is obtained by known processes. Cyclodextrin derivatives having precisely one amino substituent per CD are obtained with high selectivity by the process according to the invention. As a rule, the percentage frequency of occurrence of the monosubstituted product is greater than 80%, based on the frequency of occurrence of all the amino-substituted CD derivatives.

The additional object of the invention is achieved by CD derivatives of the formula I which, in relation to the amino substituents mentioned in formula I, have an average degree of molar substitution per anhydroglucose unit (MS) of 0.01 to 0.2 and a proportion of monamino-substituted CD derivatives which is greater than 70%.

In relation to the amino substituents mentioned in formula I, the CD derivatives according to the invention preferably have an average MS of 0.01–0.2 and a proportion of monoamino-substituted product which is greater than 80%.

CD derivatives of the formula I are particularly preferred in which k denotes the number 1.

The CD derivatives according to the invention have the advantage that their fixture to a support is not sterically hindered. In addition to this, the derivatives which are linked to a support are also found to be very capable of forming complexes.

Suitable supports are, preferably, polymers having acidic or reactive groups. Examples of such supports are acidic ion exchangers or polymers containing oxirane groups.

Because of their basic character, the cyclodextrin derivatives according to the invention can be used for binding to acidic surfaces. Acidic surfaces are understood to mean, in particular, surfaces having carboxyl groups or —$SO_3H$ groups, such as, for example, those sold under the trademark Levatit® S 100.

Because of the nucleophilic character, the derivatives according to the invention can also be used for covalent binding to reactive supports, which are understood to mean, in particular, supports having functional groups, such as, for example, halogen, epoxy or aldehyde radicals, or activated carboxylic acid derivatives (ester, halides or imidazolide). They can be immobilized, for example, on a reactive support sold under the trademark Eupergit® (process for this described in K. Laumen, E. H. Reimerdes, M. Schneider, Tetrahedron Letters 26 (4) 407–410 (1985)).

When being linked covalently or ionically via the amine function to the above-mentioned support, the CD is only linked via one arm, and the CD cavity is consequently more readily available for forming complexes than would be the case if there were two or three linkages by several arms. In addition, crosslinking reactions are avoided in association with linkage to the said supports.

Consequently, surfaces can be modified with the aminofunctional CD derivatives according to the invention. The CD derivatives which are thus fixed to supports can then, likewise, be used for all applications which are known for cyclodextrins and their derivatives.

Examples of such applications are odor adsorption, imparting scents, stabilization, complexing/formulating active compounds, and complexing interfering components.

DETAILED DESCRIPTION OF THE PREFERRED EMBODIMENT

Other objects and features of the present invention will become apparent from the following examples considered in connection with the accompanying detailed description of preferred embodiments which discloses several embodiments of the present invention. It should be understood, however, that the examples are designed for the purpose of illustration only and not as a definition of the limits of the invention.

The course of the reactions described in the examples was monitored using thin layer chromatography.

EXAMPLE 1

Preparation of 2-methylaminoethyl (MS, 0.12)-β-cyclodextrin.

Mixture:

10 g (7.6 mmol) of β-cyclodextrin (water content, 13%)

2.4 g (4.2 mmol) of potassium carbonate 56 g (560 mmol) of 3-methyl-2-oxazolidinone Apparatus: Reaction flask with distillation head Implementation: The β-CD and 25% of the above-mentioned quantity of potassium carbonate were mixed with 3-methyl-2-oxazolidinone and heated to 125° C. Everything was completely dissolved apart from the potassium carbonate. The remaining quantities of potassium carbonate were added in 25% portions at intervals of 2 h. After a total of 8 h at 125° C. (slight vacuum: approximately 200 mm Hg), unreacted 3-methyl-2-oxazolidinone was distilled off (recovery, 50 g=90%) under high vacuum (approximately 0.1 mm Hg). The residue was dissolved in a little water (approximately 20 ml), and added dropwise to acetone (approximately 200 ml). The precipitate was centrifuged off and dried. The MS value was determined by NMR spectroscopy (1H NMR in dimethyl sulfoxide (DMSO)/5 vol.% of trifluoroacetic acid). Yield, 9.8 g of 2-methylamino-ethyl (MS, 0.12)-β-cyclodextrin.

The product thus obtained was characterized by means of f.a.b. mass spectroscopy. The percentage frequency distribution of the molecular weights is given in Table 1. The percentage molecular weight distribution as calculated for a statistical distribution at an MS of 0.12 is also given for comparison.

TABLE 1

| Number of substituents | % Ex. 1 | % calculated |
|---|---|---|
| 0 | 41% | 42% |
| 1 | 51% | 37% |
| 2 | 6% | 15% |
| 3 | 2% | 4% |
| 4 | 0% | 1% |
| Selectivity for monosubstitution | 86% | 65% |

EXAMPLE 2

Preparation of 2-methylaminoethyl ( 0.1 ) -hydroxpropyl- (0.7) -β-cyclodextrin

Mixture:

54.6 g (38.5 mmol) of hydroxpropyl-β-CD (0.7)

2.9 g (21 mmol) of potassium carbonate 280 g (2.77 mol) of 3-methyl-2-oxazolidinone Apparatus: Reaction flask with distillation head Implementation: The hydroxpropyl-β-CD, MS: (0.7) (prepared as described in WO 90/12035, Ex. 1) and 25% of the quantity of potassium carbonate were mixed in 25% of the quantity of 3-methyl-2-oxazolidinone and heated to 125° C.

Everything was completely dissolved apart from the potassium carbonate. The remaining quantities of potassium carbonate and 3-methyl-2-oxazolidinone were added in 25% portions at intervals of 2 h After a total of 8 h at 125° C. unreacted 3-methyl-2-oxazolidinone was distilled off (recovery, 250 g=89%) under high vacuum. The residue was dissolved in a little water (approximately 60 ml) and added dropwise to acetone (approximately 600 ml). The precipitate was centrifuged off and dried. Yield, 55.2 g of 2-methylaminoethyl(0.1)-hydroxypropyl (0.7)-β-cyclodextrin.

EXAMPLE 3

Preparation of 2-aminoethyl(1.2)-β-cyclodextrin

Mixture:

2 g (1.5 mmol) of β-cyclodextrin (water content 13%)

0.10 g (2.5 mmol) of sodium hydroxide 4.8 g (55 mmol) of 2-oxazolidinone

Apparatus: Reaction flask with distillation head

Implementation: β-CD, sodium hydroxide and 2-oxazolidinone were mixed and heated at 150° C. for 8 h. The reaction mixture was dissolved in a little water (approximately 5 ml) and added dropwise to acetone (approximately 50 ml). The precipitate was centrifuged off and dried. Yield, 1.9 g of 2-aminoethyl (1.2)-β-cyclodextrin.

EXAMPLE 4

Preparation of 2-methylaminoethyl(0.1)-α-cyclodextrin

Mixture:

1 g (0.85 mmol) of α-cyclodextrin (water content 10.6%)

70 mg (0.5 mmol) of potassium carbonate 2.83 g (28 mmol) of 3-methyl-2-oxazolidinone Apparatus: Reaction flask with distillation head Implementation: The α-CD and 25% of the quantity of potassium carbonate were mixed with 3-methyl-2-oxazolidinone and heated to 125° C. Everything was completely dissolved apart from the potassium carbonate. The remaining quantities of potassium carbonate were added in 25% portions at intervals of 2 h. After a total of 8 h at 125° C. (slight vacuum: approximately 200 mm Hg), unreacted 3-methyl-2-oxazolidinone was distilled off under high vacuum. The residue was dissolved in a little water (approximately 15 ml) and added dropwise to acetone (approximately 150 ml). The precipitate was centrifuged off and dried. Yield, 1.0 g of 2-methylaminoethyl(0.1)-α-cyclodextrin.

EXAMPLE 5

2-Methylaminoethyl(0.1)-hydroxypropyl(0.4)-β-cyclodextrin in a one-pot process

Mixture:

3 g (2.3 mmol) of β-cyclodextrin (water content 13%)

5.8 g = 7 ml (0.1 mol) of propylene oxide 0.24 g (1.7 mmol) of potassium carbonate 13 g (129 mmol) of 3-methyl-2-oxazolidinone Apparatus: Reaction flask with distillation head Implementation: β-CD, potassium carbonate and propylene oxide were mixed and boiled under reflux for 5 h. 3-Methyl-2-oxazolidinone was then added and the mixture was heated slowly (2 h) to 130° C., with excess propylene oxide being distilled off. After that, a slight vacuum (200 mm Hg) was applied and the mixture was stirred at 130° C. for a further 6 h. At the end of the reaction, excess 3-methyl-2-oxazolidinone was distilled off at 1 mm Hg, and the residue was taken up in water and this solution was dialyzed and freeze-dried. Yield, 2.6 g of 2-methylaminoethyl ( 0.1 ) -hydroxypropyl ( 0.4 ) -β-cyclodextrin.

EXAMPLE 6

2-Methylaminoethyl(0.15)-hydroxypropyl(1.0)-β-cyclodextrin in a one-pot process

Mixture:

2.48 g (1.9 mmol) of β-cyclodextrin (water content, 13%)

1.08 g=1.3 ml (18.6 mmol) of propylene oxide 0.22 g (5.5 mmol) of sodium hydroxide 2.34 g of water 5 g (49.5 mmol) of 3-methyl-2-oxazolidinone Apparatus: Reaction flask with distillation head Implementation: α-CD, sodium hydroxide, water and propylene oxide were mixed and stirred at approximately 7° C. for 5 h and at 20° C. for 17 h. 3-Methyl-2-oxazolidinone was then added and the mixture was heated slowly (2 h) to 125° C. During this process, a slight vacuum (approximately 200 mm Hg) was applied. Excess propylene oxide and water distill off. After that, the mixture was stirred at 130° C. for a further 8 h. At the end of the reaction, excess 3-methyl-2-oxazolidinone was distilled off at 1 mm Hg. The reaction mixture was taken up in water, dialyzed and freeze-dried. Yield, 2.1 g of 2-methylaminoethyl (0.15)-hydroxypropyl(1.0)-β-cyclodextrin.

EXAMPLE 7

Removal of CD's which are not amino-functionalized and reversible immobilization of the CD's according to the invention on an acidic support 10 g of 2-methylaminoethyl(0.1)-hydroxypropyl(0.7)-β-cyclodextrin (prepared in accordance with Ex. 2) were taken up in 60 ml of water and this solution was loaded onto a column (column volume, 500 ml) packed with acidic ion exchanger (Levatit® MP 62 from Bayer AG, Leverkusen, activated with 1N HCl and washed until neutral). Hydroxypropyl-β-CD (MS: 0.7) which was not amino-substituted was eluted with 2 l of water. Yield, 3.5 g of hydroxypropyl-β-CD (MS: 0.7).

The 2-methylaminoethyl (0.1)-hydroxypropyl(0.7)-β-cyclodextrin according to the invention, which was immobilized on the ion exchanger, was eluted using 1 l of a solution of 1N NaCl and dialyzed (dialysis tubing consisting of benzoylated cellulose (from Sigma)). Yield: 5.5 g of 2-methylaminoethyl (0.1)-hydroxypropyl(0.7)-β-cyclodextrin.

While several embodiments of the present invention have been shown and described, it is to be understood that many changes and modifications may be made thereunto without departing from the spirit and scope of the invention as defined in the appended claims.

What is claimed is:

1. A process for preparing cyclodextrin (CD) derivatives having an amino function which is linked to the CD via a spacer, comprising reacting α-cyclodextrin, a partially substituted α-cyclodextrin derivative, β-cyclodextrin, a partially substituted β-cyclodextrin derivative, γ-cyclodextrin, a partially substituted γ-cyclodextrin derivative, or mixtures thereof, in the presence of a catalyst, with at least one cyclic carbamic ester;

and utilizing at least one base or at least one basic ion exchanger as said catalyst.

2. The process as claimed in claim 1, comprising carring out the reacting in the presence of an anhydrous catalyst.

3. The process as claimed in claim 1, wherein said at least one cyclic carbamic ester is selected from the group consisting of 2-oxazolidinone, 3-methyl-2-oxazolididone, 3-ethyl-2-oxazolidinone, 3-propyl-2-oxazolidinone, 3-butyl-2-oxazolidinone, 3-(2-hydroxyethyl)-2-oxazolidinone, 3-(2-hydroxypropyl)-2-oxazolidinone, 3-phenyl-2-oxazolidinone, 3-acetyl-2-oxazolidinone, 3-propionyl-2-oxazolidinone, 4-ethyl-2-oxazolidinone, 4-isopropyl-2-oxazolidinone, 4-tert-butyl-2-oxazolidinone, 4-benzyl-2-oxazolidinone, 4-phenyl-2-oxazolidinone, 5-methyl-2-oxazolidinone 3-(2-hydroxypropyl)-5-methyl-2-oxazolidinone, 3-(2-hydroxypropyl)-5-methyl-2-oxazolidinone, 4-methyl-5-propyl-2-oxazolidinone, 4-methyl-5-phenyl-2-oxazolidinone, 1-oxa-2-azaspiro[4.5]decan-2-one, 2-oxazinone 2-oxazepinone, and the mixtures thereof.

4. The process as claimed in claim 2, comprising utilizing said cyclodextrin and said cyclic carbamic ester in a molar ratio of from 1:0.2 to 1:20, and utilizing said cyclodextrin and said anhydrous catalyst in a molar ratio of from 1:0.01 to 1:10.

5. The process as claimed in claim 1, comprising carrying out the reacting at a temperature of from 60° to 170° C. over a period of from 2 to 10 hours.

6. A cyclodextrin derivative of the formula I

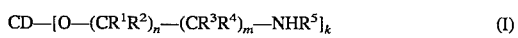

wherein CD denotes alpha-cyclodextrin, beta-cyclodextrin or gamma-cyclodextrin, or a derivative of alpha-cyclodextrin, a derivative of beta-cyclodextrin or a derivative of gamma-cyclodextrin, having at least one free OH group, wherein $R^1$, $R^2$, $R^3$ and $R^4$ are either identical or different and denote hydrogen, $C_1$ to $C_4$ alkyl, aryl, or aryl which is substituted by hydroxyl, $C_1$ to $C_4$ alkoxy, halogen or $C_1$ to $C_4$ alkylamine, or, when two of the radicals $R^1$ to $R^4$ are linked, $C_1$ to $C_4$ cycloalkyl, or $C_1$ to $C_4$ cycloalkyl- which is substituted by hydrogen, $C_1$ to $C_4$ alkoxy, halogen or $C_1$ to $C_4$ alkylamine;

$R^5$ has the same meaning as mentioned for $R^1$ to $R^4$, or denotes carboxyl, n and m are either identical or different and denote 1, 2 or 3.

and, if CD is α-cyclodextrin, k denotes an integer from 1 to 18, or, if CD is β-cyclodextrin, k denotes an integer from 1 to 21, or, if CD is β-cyclodextrin, k denotes an integer from 1 to 24, or, if CD is one of the said CD derivatives, k denotes an integer from 1 up to the number of free OH groups on the CD derivative, which has, as regards the listed amino substituents, an average degree of molar substitution per anhydroglucose unit (MS) of 0.01–0.2 and a proportion of monoamino-substituted CD derivatives which is greater than 70%.

7. A CD derivative as claimed in claim 6, which has, as regards the listed amino substituents, an MS of 0.01–0.2 and a proportion of monoamino-substituted product which is greater than 80%.

8. A cyclodextrin derivative of the formula I

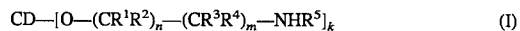

wherein CD denotes alpha-cyclodextrin, beta-cyclodextrin, gamma-cyclodextrin, or a derivative of alpha-cyclodextrin, a derivative of beta-cyclodextrin or a derivative of gamma-cyclodextrin, having at least one free OH group, $R^1$, $R^2$, $R^3$ and $R^4$ are either identical or different and denote hydrogen, or $C_1$ to $C_4$ alkyl, aryl, aryl- which is substituted by hydroxyl, $C_1$ to $C_4$ alkoxy, halogen, $C_1$ to $C_4$ alkylamine, or, when two of the radicals $R^1$ to $R^4$ are linked, $C_1$ to $C_4$ cycloalkyl, or $C_1$ to $C_4$ cycloalkyl- which is substituted by hydroxyl, $C_1$ to $C_4$ alkoxy, halogen or $C_1$ to $C_4$ alkylamine, $R^5$ has the same meaning as mentioned for $R^1$ to $R^4$, or denotes carboxyl-, n and m are either identical or different and denote 1, 2 or 3, and k denotes the number 1.

9. A cyclodextrin derivative of the formula I

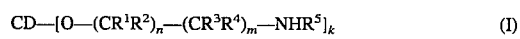

wherein CD denotes alpha-cyclodextrin, beta-cyclodextrin or gamma-cyclodextrin, or a derivative of alpha-cyclodextrin, a derivative of beta-cyclodextrin or a derivative of gamma-cyclodextrin, having at least one free OH group, wherein $R^1$, $R^2$, $R^3$ and $R^4$ are either identical or different and denote hydrogen, $C_1$ to $C_4$ alkyl, or aryl, $R^5$ has the same meaning as mentioned for $R^1$ to $R^4$, or denotes carboxyl, n and m are either identical or different and denote 1, 2 or 3.

and, if CD is α-cyclodextrin, k denotes an integer from 1 to 18, or, if CD is β-cyclodextrin, k denotes an integer from 1 to 21, or, if CD is γ-cyclodextrin, k denotes an integer from 1 to 24, or, if CD is one of the said CD derivatives, k denotes an integer from 1 up to the number of free OH groups on the CD derivative, which has, as regards the listed amino substituents, an average degree of molar substitution per anhydroglucose unit (MS) of 0.01–0.2 and a proportion of monoamino-substituted CD derivatives which is greater than 70%.

10. A cyclodextrin derivative of the formula I

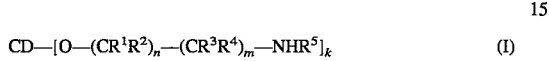  (I)

wherein CD denotes alpha-cyclodextrin, beta-cyclodextrin, gamma-cyclodextrin, or a derivative of alpha-cyclodextrin, a derivative of beta-cyclodextrin or a derivative of gamma-cyclodextrin, having at least one free OH group, $R^1$, $R^2$, $R^3$ and $R^4$ are either identical or different and denote hydrogen, or $C_1$ to $C_4$ alkyl, or aryl, $R^5$ has the same meaning as mentioned for $R^1$ to $R^4$ or denotes carboxyl-, n and m are either identical or different and denote 1, 2 or 3, and k denotes the number 1.

* * * * *